United States Patent [19]

Bahr et al.

[11] 4,392,143

[45] Jul. 5, 1983

[54] RECORD CARRIER FOR ELECTRO-EROSION PRINTERS

[75] Inventors: Dietrich J. Bahr, Herrenberg; Marian Briska, Böblingen, all of Fed. Rep. of Germany

[73] Assignee: International Business Machines Corporation, Armonk, N.Y.

[21] Appl. No.: 288,632

[22] Filed: Jul. 30, 1981

[30] Foreign Application Priority Data

Sep. 3, 1980 [DE] Fed. Rep. of Germany ....... 3033069

[51] Int. Cl.³ .............................................. G01D 15/24

[52] U.S. Cl. .............................................. 346/135.1

[58] Field of Search ..................... 346/135.1; 427/180, 427/373, 331, 411

[56] References Cited

U.S. PATENT DOCUMENTS 4,177,310 12/1979 Steeves ................................ 427/411

4,217,596 9/1980 Jung ................................ 346/135.1

*Primary Examiner*—Joseph W. Hartary

*Assistant Examiner*—Derek S. Jennings

*Attorney, Agent, or Firm*—Joseph G. Walsh

[57] ABSTRACT

A record carrier for electro-erosion printers in which the surface of the lacquer (3) and consequently also the surface of the superimposed aluminum layer (5) show a multitude of shallow dimples (6) in the μ range which are very small compared with the front surfaces of the print electrodes, which are of maximum uniformity, and whose spacing is equally in the μ range.

4 Claims, 3 Drawing Figures

RECORD CARRIER FOR ELECTRO-EROSION PRINTERS

FIELD OF INVENTION

This invention relates to record carriers for electro-erosion printers, with a gliding and scratching trace-resistant surface structure of the thin metallic layer over a lacquer layer covering a carrier material.

PRIOR ART

Metallized record carriers, i.e. record carriers coated or vapor-deposited with a metal, preferably with aluminum, need for problem-free reproduction a surface of a reflection of maximum diffusion, i.e. they must show a high degree of dullness. Generally such a dullness is achieved in that the lacquer under the metallic layer, i.e. the aluminum layer, is enriched with pigments. Thus, a surface structure is obtained as shown e.g. in FIG. 1. The impinging light is reflected in all directions, i.e. diffusely from the surface sectors of differing inclination. The higher the percentage of diffuse reflection is to be the greater the pigment contents of the lacquer.

Record carriers of this type are to be printed upon with an electrode, or a multiple arrangement of electrodes which are to be in continuous contact with the metallic layer, i.e. the electrode points are to glide continuously over the metallic layer. FIG. 1 clearly shows that when relatively soft pigments are involved the pigment peaks protruding from the lacquer layer can be slightly damaged by the electrodes gliding over them. In those areas where for recording purposes the metallic layer is evaporated or burnished at any rate this would be of no consequence, but where the electrodes wipe or glide over the record carrier without any printing taking place, the metallic layer is frequenty destroyed mechanically; the dark lacquer becomes visible, and the highly undesirable gliding and scratching traces appear.

This problem could be solved in that mechanically highly resistant pigments are used. However, the consequence would be an inacceptably high electrode wear due to abrasion. Both solutions are unsatisfactory in the long run.

SUMMARY OF THE INVENTION

It is therefore the object of the invention to provide a novel structure of the surface of such a record carrier which, owing to its characteristics, has a much lower tendency to scratching and gliding traces. According to the invention, this is achieved for a record carrier of the above specified type in that the surface of the lacquer layer, and consequently also the surface of the thin metallic layer, show a multitude of shallow dimples in the micrometer range which are very small compared with the front surface area of the print electrodes, the shallow dimples being of maximum uniformity, and whose distance from each other is much smaller than the print electrode diameter. Preferably, the arrangement is such that the dimples are approximately cup-shaped, and that the depth of the individual dimples is generally lower than their lateral dimensions relative to each other. There naturally exists a number of conceivable methods by which such a surface can be made. The various production methods are given in detail in the subclaims.

BRIEF DESCRIPTION OF THE DRAWINGS

The invention will not be described in detail with reference to embodiments illustrated by the attached drawings.

The drawings show the following.

Figure 1:
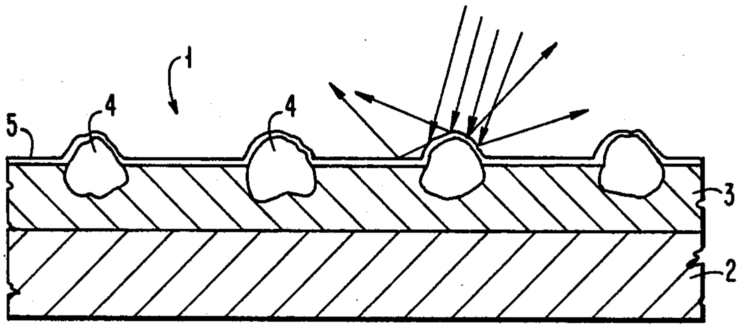
FIG. 1 PRIOR ART
FIG. 1 a record carrier in accordance with prior art.

A record carrier 1 of prior art consists of a substrate or carrier material 2, or a lacquer layer 3 with pigments 4 embodied therein, and a vapor-deposited thin aluminum layer 5 of approximately 20 to 40 nm.

The solution in accordance with the invention starts from the following idea. All former record carriers had a surface structure characterized by pigment grains more or less protruding from the lacquer layer plane, and more or less coated by the lacquer layer.

Figure 2:
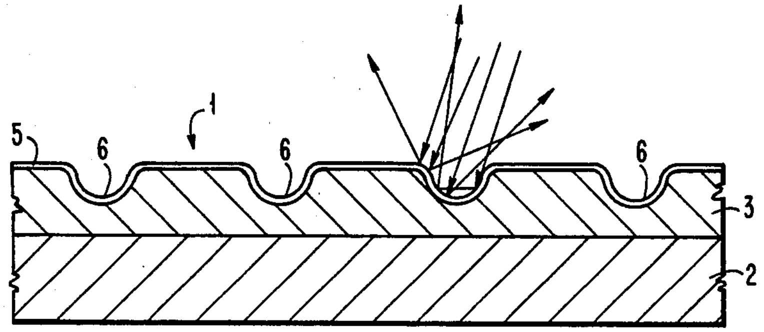
FIG. 2 a record carrier composed in accordance with the present invention, and FIG. 3 another embodiment of a record carrier composed in accordance with the present invention.

The formerly encountered problems resulted from the fact that the electrodes glide practically on the peaks of these pigments only. It is now the idea of the invention optically to disrupt the surface of record carrier 1 in that a kind of negative is made of the surface structure shown in FIG. 1, i.e. through dimples 6 instead of protrusions as shown in FIG. 2. The electrodes whose diameter is a multiple of the distance between individual dimples now move on a kind of plateau where the metallic layer can much less easily be disrupted by the electrodes. The metallic layer is, however, practically indestructible when it is coated with a highly effective gliding agent of a thickness of some nanometers, e.g. with a metallic soap or a modified metallic soap. As pointed out above, such a surface structure of the record carrier can be made according to various methods. Experience made up to now with pigmented lacquers shows that for obtaining the necessary dullness $10^3$ to $10^5$ pigment grains per $mm^2$ are required. The density of the pigment grains also depends on their size and shape. Up to now, a spherical segment has turned out to be the most effective shape for the pigment grains since they show the lowest greying effect connected with increasing dullness. Consequently, the hole density of dimples 6 should correspond thereto.

As a rule, the novel record carrier should be composed on a carrier material that is extremely smooth and plane. In a first embodiment, the lacquer is pigmented with large pigment particles whose diameter is a multiple of the dry film thickness of the pure binder, which, after the drying of the lacquer, is dissolved by means of heat, radiation, or gaseous or fluid chemical substances. Assuming that almost spherical pigment particles are used, there remain in the lacquer layer the negative imprints of these pigment particles as cup-shaped dimples 6. Another way consists in bombarding with laser beams the surface of a dry, colorless, or finely pigmented lacquer, or of a lacquer dyed with a soluble dye, and thus to make the necessary dimples. It may suffice to effect a local remelting of the lacquer on the surface, and subsequently a rough solidification of the surface to achieve the necessary dullness. Subsequently, the metallic layer can be vapor deposited.

It is pointed out in that connection that for this purpose a commercially available, pulsed ruby laser with a wave length of $\lambda, \sim 0.7\mu$ can be used, with an output of approximately $10^9$ Watt/$cm^2$. The laser beam is optically deflected over the surface of the record carrier. If e.g. a dimple density of $5\times10^5$ per $cm^2$, a dimple diameter of up to 10 micrometer, a dimple distance of up to 4 micrometer, and a dimple depth of approximately 2 micrometer are assumed, and a pulse duration of 2 ns, approximately 24 $m^2$ record carrier material can thus be processed in one minute.

Figure 3:
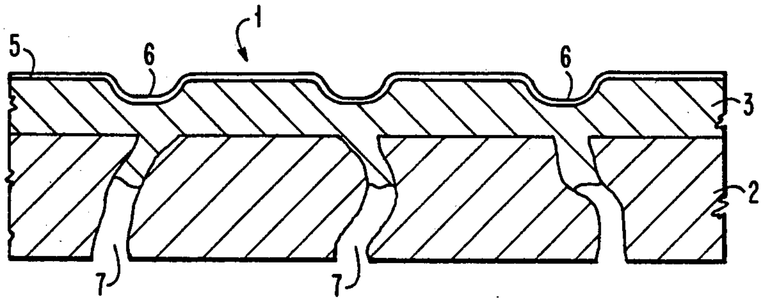

Another very elegant solution consists in that as a carrier material 2 a smooth, plain paper is used which, similarly to microfilters, shows a large number of microscopically small pores (7). Such a paper is traversed by capillaries of the necessary size and density. When the surface of such a paper is coated with a colorless lacquer, an unpigmented lacquer dyed black, or a black lacquer dyed with carbon black of maximum dispersion and a grain size of less than 0.2 micrometer of corresponding viscosity, this lacquer is partly attracted by the capillaries, and forms the necessary dimples 6 on the surface during drying. Such a structure is shown in FIG. 3 in a strictly schematic large scale representation.

The advantage of such a surface structure of a record carrier consists in that the electrode points wiping or gliding over the surface find a much greater support surface than with pigmented lacquers where the individual pigment grains protrude over the lacquer layer surface, although coated by a thin lacquer skin. The much greater support surface in connection with the rounded edges of the cup-shaped dimples offers for the entire surface of the record carrier a much smaller surface of attack for the print electrodes, and thus also for the generation of the undesired gliding and scratching traces on the thin aluminum layer. When in addition the surface of the thin aluminum layer is provided with a coating of a metallic soap or of a modified metallic soap, it is to be expected that gliding and scratching traces can practically be eliminated completely.

We claim:

1. A record carrier for use with print electrodes of electro-erosion printers, with a gliding and scratching trace-resistant surface structure of a thin metallic layer provided over a lacquer layer on a carrier material, characterized in that the surface of the lacquer layer (3) and consequently also the surface of the thin metallic layer (5) are provided with a multitude of shallow dimples (6) in the micrometer range which are very small compared with the front surface of the print electrodes, which are of maximum uniformity, whose rims are rounded, and which are roughly cup-shaped and of depth generally lower than their lateral dimensions, and whose distance from each other is very much smaller than the print electrode diameter.

2. A record carrier as claimed in claim 1 characterized in that the carrier material (2) shows a great number of microscopically small pores (7) into which parts of the lacquer layer (3) can penetrate upon application owing to the capillary action.

3. A record carrier as claimed in claim 1, characterized in that the lacquer layer is filled either not at all, or only slightly with soft pigments, or mixed with an equally effective quantity of a soluble dye.

4. A record carrier as claimed in claim 1, characterized in that the cup-shaped dimples (6) have a diameter of up to 10 micrometers, a lateral distance from each other of up to 4 micrometers, and a depth of approximately 2 micrometers.

* * * * *